United States Patent
Mademann et al.

(10) Patent No.: US 9,439,127 B2
(45) Date of Patent: Sep. 6, 2016

(54) METHOD FOR DATA TRANSMISSION AND LOCAL NETWORK ENTITY

(71) Applicant: Huawei Technologies Co., Ltd., Shenzhen, Guangdong, P.R. (CN)

(72) Inventors: Frank Mademann, Berlin (DE); Qing Zhou, Berlin (DE)

(73) Assignee: Huawei Technologies Co., Ltd., Shenzhen (CN)

(*) Notice: Subject to any disclaimer, the term of this patent is extended or adjusted under 35 U.S.C. 154(b) by 158 days.

(21) Appl. No.: 14/161,425

(22) Filed: Jan. 22, 2014

(65) Prior Publication Data

US 2014/0198781 A1    Jul. 17, 2014

Related U.S. Application Data

(63) Continuation of application No. PCT/CN2011/077770, filed on Jul. 29, 2011.

(51) Int. Cl.
*H04W 40/02* (2009.01)
*H04W 8/08* (2009.01)
*H04L 12/741* (2013.01)

(52) U.S. Cl.
CPC ............. *H04W 40/02* (2013.01); *H04W 8/082* (2013.01); *H04L 45/74* (2013.01)

(58) Field of Classification Search
CPC .................................................... H04W 40/02
See application file for complete search history.

(56) References Cited

U.S. PATENT DOCUMENTS

| | | | |
|---|---|---|---|
| 2005/0198372 A1 | 9/2005 | Narayanan et al. | |
| 2009/0279522 A1* | 11/2009 | Leroy et al. | 370/338 |
| 2010/0020812 A1 | 1/2010 | Nakamura et al. | |
| 2011/0038318 A1* | 2/2011 | Parsons | H04W 80/04 370/328 |
| 2011/0124328 A1* | 5/2011 | Kim | 455/422.1 |
| 2012/0147872 A1* | 6/2012 | Zisimopoulos et al. | 370/338 |
| 2014/0059192 A1* | 2/2014 | Miklos | 709/221 |

FOREIGN PATENT DOCUMENTS

| | | |
|---|---|---|
| CN | 1567860 A | 1/2005 |
| CN | 101360059 A | 2/2009 |
| CN | 101489221 A | 7/2009 |
| EP | 2 045 990 A1 | 4/2009 |
| WO | WO 2007/120915 A2 | 10/2007 |

OTHER PUBLICATIONS

"3rd Generation Partnership Project; Technical Specification Group Services and System Aspects; Local IP Access and Selected IP Traffic Offload (Release 10)", 3GPP 23.829 v1.3.0, Sep. 2010, 44 pages.

* cited by examiner

*Primary Examiner* — Jason Mattis (57) ABSTRACT

The invention relates to a method for data transmission with a local network, the local network comprising a plurality of local network entities for connecting mobile entities to the local network and at least one local network entity for connecting the local network to a data network. The method comprises receiving, by a first local network entity of the local network entities of the local network, a data packet, the network address of the first mobile entity on the basis of the data packet, determining, by the first local network entity on the basis of the network address of the first mobile entity, the second local network entity, via which the first mobile entity is connected to the local network, and forwarding, by the first local network entity, the data comprised by the data packet to the first mobile entity via the second local network entity.

14 Claims, 7 Drawing Sheets

METHOD FOR DATA TRANSMISSION AND LOCAL NETWORK ENTITY

CROSS-REFERENCE TO RELATED APPLICATION

This application is a continuation of International Application No. PCT/CN2011/077770, filed on Jul. 29, 2011, which is hereby incorporated by reference in its entirety.

TECHNICAL FIELD

The invention relates to the field of communication networks and in particular to mobile communication networks.

BACKGROUND

In current communication networks it is possible to connect to a packet data network, for example the Internet, by means of a mobile terminal. To this end, a mobile communication provider usually deploys several network entities like gateways that establish a connection to the packet data network for the mobile terminal.

The mobile terminal is connected to a local network by means of, for example, an access point and has a network address allocated by a respective entity in the packet data network. Furthermore, a mobile anchor point is allocated for the mobile terminal, for example a Gateway GPRS Support Node (GGSN) or a packet data network gateway, which is usually on the data path for all data traffic from and to the mobile terminal. Hence, all data packets of a data connection or to the mobile terminal are routed through the mobile anchor point.

However, data traffic is routed through the mobile anchor point even if mobile terminals are connected to the same local network and data are to be transmitted between two mobile terminals of this same local network. The local network is a subset of the packet data network and it provides more local connectivity from topological point of view. Voice-over-IP (VoIP) traffic between two mobile terminals may have a more local nature, for example being traffic between users of the same local network, e.g. within a corporate network. However, if such traffic is routed via the mobile anchor point as in conventional solutions, bandwidth resources or other resources are wasted because the data path between the mobile terminals that are in the same local network has to traverse the mobile anchor point(s) of the packet data network.

SUMMARY

It is the object of the present invention to provide a concept for resource efficient data transmission between mobile terminals connected to a local network.

This object is achieved by the features of the independent claims. Further embodiments are apparent from the dependent claims.

The invention is based on the finding that data traffic, in particular data packets, can be differentiated, whether they have a final destination in the local network, although the default routing would be to an entity in a data network, which is outside the local network. If the differentiation process finds a local address, in particular an address within the local network, a more direct route to the final destination can be determined, such that the differentiated data packet can be sent to the final destination in the local network in a more efficient way. In particular, routing from the local network over the routing entity of the data network can be omitted, thus saving bandwidth between the local network and the routing entity.

According to a first aspect, the invention relates to a method for data transmission within a local network. The local network comprises a plurality of local network entities, e.g. routers, for connecting mobile entities to the local network and at least one local network entity for connecting the local network to a data network. The data network comprises at least a routing entity. A first mobile entity is connected to the local network via a first local network entity, e.g. a local access router, of the plurality of local network entities and has a first network address allocated. A second mobile entity is connected to the local network via the same or a second local network entity of the plurality of local network entities and has a second network address allocated. The method comprises receiving, by a first local network entity of the local network entities of the local network, a data packet from the first mobile entity being addressed to the second mobile entity, in particular to the network address of the second mobile entity. The default routing of all data packets originated by the mobile entities is via the local network entity for connecting the local network to a data network because the default data path traverses the mobile anchor point. This is gained, e.g. by encapsulating the data packets originated by the mobile entities in other data packet with the destination address of the mobile anchor point. The first local network entity determines, whether the data packets originated by the first mobile node have a destination network address that is allocated to an entity within the local network. If, for example, data packets originated by the first mobile node address the second mobile node the first local network entity forwards that data packets to the second local network entity. And the second local network entity forwards the data packets to the second mobile node. The approach is the same when one or both of the mobile nodes are fixed nodes, e.g. for communication between a mobile node and a server with both in the same local network.

A network address is particularly allocated unambiguously to the first mobile entity and to the second mobile entity according to some implementation forms. The network address can for example be allocated by an entity of the data network that is external to the local network. The data network may be a packet data network, for example the Internet, or a core network of a mobile communications system.

The data packet received by a first local network entity may originate from within the local network, for example from another mobile entity which is connected to the local network via the first local network entity or a second local network entity of the plurality of local network entities. However, the data packet may also originate from outside the local network, wherein the first local network entity can for example be a gateway to a further local network. Accordingly, instead of forwarding the data packet to the routing entity as in conventional solutions, the routing of the data packet is performed within or between the local network entities, if the second local network entity and/or a gateway to a further local network can be determined by the first local network entity. The local network entity can for example be a local network router.

According to a first implementation form of the first aspect, the invention relates to the method for data transmission, wherein mapping information between the first local network entity and the first mobile entity is stored, and determining the first local network entity comprises using the stored mapping information. If the mapping between the first mobile entity and the first local network entity is once determined by a second local network entity on the basis of the network address of the first mobile entity, the second local network entity can for example cache this mapping information and use it when receiving a further data packet destined for the first mobile entity. According to some implementation forms, the mapping information between a first mobile entity and a first local network entity is stored in a specific network entity within the local network and may be retrieved by a respective request from a second local network entity for receiving the mapping information.

According to a second implementation form of the first aspect, the invention relates to the method for data transmission, wherein determining the first local network entity comprises sending a request from a second local network entity to the plurality of local network entities, in particular a broadcast request, for receiving the mapping information between the first local network entity and the first mobile entity, the request comprising the network address of the first mobile entity. Hence, the second local network entity resolves the mapping between the first local network entity and the first mobile entity by sending the request to one or more or all local network entities of the local network. The request can for example be sent according to an Address Resolution Protocol (ARP), e.g., according to RFC 826 "An Ethernet Address Resolution Protocol", in particular as an ARP request. The entity of the local network having the requested mapping information, typically the first local network entity, responds with the mapping information, for example by an ARP response.

According to some implementation forms, the first local network entity sends the requested mapping information in response to the request of the second local network entity. In general, at least one or each local network entity of the plurality of local network entities may respond to a respective request for mapping information, if the request comprises the network address of the mobile entity that the respective local network entity connects to the local network.

According to some further implementation forms, the local network comprises a network entity, e.g. a local resolution server, for storing mapping information between the network address of each mobile entity connected to the local network and the corresponding local network entity via which the mobile entity is connected to the local network. The local resolution server sends the stored mapping information between the first local network entity and the first mobile entity in response to the request of the second local network entity. If a connection of a first mobile entity to the data network is established by means of one of the plurality of local network entities, the respective mapping information is sent from the connecting first local network entity to the local resolution server when the first mobile entity associates with the first local network entity, such that the mapping information is registered with the local resolution server.

According to a third implementation form of the first aspect, the invention relates to the method for data transmission wherein the first local network entity sends a further data packet(s) originated by the first mobile node to the local network, in particular before receiving a data packet from the second local network entity originated by the second mobile node and addressed to the first mobile node. The second local network node determines and remembers the mapping between the first mobile node and the first local network entity from further data packet(s) belonging to other short-cuts, e.g. between the first mobile node and a third mobile node that is also associated with the second local network entity. The further data packet can for example also be regular data traffic within the local network, in particular originating from the first mobile entity and forwarded via the second local network entity to a third local network entity. The further data packet(s) may be sent any time before the reception of a data packet from the second mobile node addressed to the first mobile node by the second local network entity, such that the mapping information may be known to the second local network entity at the time of the reception of the data packet addressed to the first mobile node. The mapping information determined from the further data packet(s) can for example be stored in the second local network entity.

According to some implementation forms, the further data packet is included in a broadcast message to the local network entities of the local network. The broadcast message may be sent as an update message for announcing the mapping information. The first mobile entity may undergo a hand-over from another local network entity to the second local network entity, such that a former mapping information for the first mobile entity becomes invalid and the new, valid mapping information is sent as an update message in the form of a broadcast message to the local network entities.

According to some implementation forms, the further data packet is included in a unicast message to the first local network entity. Data traffic from the first mobile entity may be directed to the first local network entity and sent via the second local network entity, such that the mapping information between the first mobile entity and the second local network entity is included in the unicast message. The final destination address of the unicast message is not limited to the first local network entity itself, but can also include further destinations reached via the first local network entity, for example a mobile entity connected to the local network via the first local network entity.

According to a fourth implementation form of the first aspect, the invention relates to the method for data transmission, wherein forwarding comprises sending the data comprised by the data packet from the first local network entity to the second local network entity and from the second local network entity to the first mobile entity. In particular, the data path for the data comprised by the data packet comprises a direct connection from the first local network entity to the second local network entity and a direct connection from the second local network entity to the first mobile entity. And here we have the model where first mobile connects to second node.

According to a fifth implementation form of the first aspect, the invention relates to the method for data transmission, wherein the routing entity is further comprised by the local network, in particular by one of the local network entities of the local network. The routing entity may be a gateway and may be a part of both the local network and the data network.

According to a sixth implementation form of the first aspect, the invention relates to the method for data transmission, wherein the data packet is forwarded to the first local network entity by the second local network entity.

The mapping information according to the implementation forms described above may comprise the network address of the first mobile entity and an address of the second local network entity. The network address of the first mobile entity may be an IP address. The address of the second local network entity may be an IP address of the second local network entity or a media access control (MAC0 address of the second local network entity or, in general, the local network entity which connects the mobile entity to the local network. Hence a data packet forwarded from the first local network entity to the first mobile entity via the one local network entity may include the IP address of the first mobile entity and the MAC address of the one local network entity.

According to a second aspect, the invention relates to a local network entity for a local network. The local network comprises a plurality of local network entities for connecting mobile entities to the local network and at least one local network entity for connecting the local network to a data network. The data network comprises a routing entity having a router network address allocated. A first local network entity is configured to receive a data packet being addressed to the router network address and comprising data addressed to a first mobile entity, which is connected to the local network via a second local network entity of the plurality of further local network entities and has a network address allocated. The first local network entity is further configured to retrieve the network address of the first mobile entity on the basis of the data packet. On the basis of the network address of the first mobile entity, the first local network entity determines the second local network entity, via which the first mobile entity is connected to the local network, and forwards the data comprised by the data packet to the first mobile entity via the second local network entity.

Accordingly, the local network entity according to some implementation forms makes it possible to forward data or data packets, respectively, directly to the corresponding local network entity that connects the first mobile entity to the network without using the routing entity of the data network.

According to a first implementation form of the second aspect, the invention relates to a local network entity, wherein the local network entity is configured to store mapping information between the second local network entity and the first mobile entity, and to determine the second local network entity using the stored mapping information.

According to a second implementation form of the second aspect, the invention relates to a local network entity which is configured to connect at least one mobile entity to the local network and to send a mapping information between the local network entity and the at least one mobile entity connected to the local network via the local network entity in response to a request for the mapping information, the request being received from the local network. Hence, the local network entity can also serve as a connecting point for mobile entities to the local network and to provide respective mapping information between itself and the respective connected mobile entity to other local network entities requesting such mapping information.

A local network can for example comprise a plurality of local network entities according to the second aspect of the invention.

Further implementation forms of the second aspect of the invention become apparent from the various implementation forms described in conjunction with the first aspect of the invention.

BRIEF DESCRIPTION OF THE DRAWINGS

Further embodiments of the invention will be described with reference to the following figures, in which.

DETAILED DESCRIPTION

Figure 1:
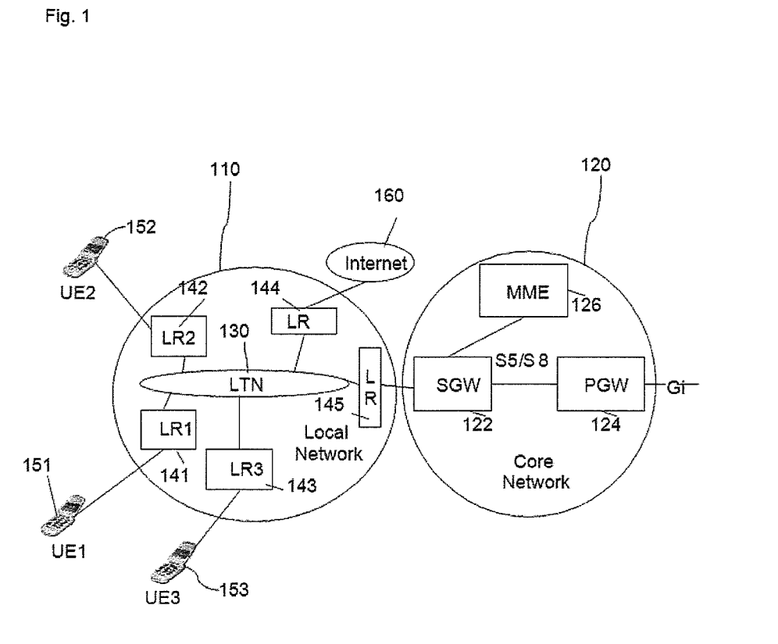
FIG. 1 shows a communication network according to an implementation form.

FIG. 1 shows a communication network according to an implementation form. The communication network comprises a local network 110 and a core network 120. The core network 120 may be a network provided by a mobile communications provider and for example comprises a serving gateway (SGW) 122, a packet data network gateway (PGW) 124, and a mobility management entity (MME) 126.

The local network 110 comprises a local transport network (LTN) 130, to which several local network entities 141, 142, 143, 144, 145 are connected for communicating with each other. The local network entities 141, 142, 143 serve as connection points for mobile entities 151, 152, 153, which may be mobile terminals such as user equipments (UE). The local network entities 141, 142, 143 may be local access points (LAP), E-node B, home eNodeB, WiFi access point or similar entities which perform a routing function for the mobile entities in the local network. The local network entity 144 may be an interworking gateway (IGW), which is connected to the Internet 160. The local network entity 145 serves as a gateway to the core network 120 and is connected to the serving gateway 122.

Accordingly, all traffic originating from or targeting at the mobile entities 151, 152, 153 respectively, are routed over their respective connecting points, namely the local network entities 141, 142, 143, respectively. Further entities can be connected to the local transport network 130, but are not shown here for the reasons of a better overview.

Although only one mobile entity is connected to each of the local network entities 141, 142, 143, more than one mobile entity can be connected to each of the local network entities 141, 142, 143. Furthermore, the local network entities 141, 142, 143 may be provided by the same or by different physical entities.

The local transport network 130 may be a physical network like an Ethernet network or a logical network like an IP network or a virtual private network (VPN).

In the following, a short overview over various embodiments of communication scenarios is given, which will be explained in more detail with respect to FIG. 2 to FIG. 6. One of the local network entities 141, 142, 143, 144, 145 receives a data packet, which is finally targeted at one of the mobile entities 151, 152, 153, for example the mobile entity 151. However, the data packet is addressed to a routing entity of the core network 120, for example the serving gateway 122. Within the data packet, an address, in particular an IP address of the mobile entity 151, is included or encapsulated. The local router, which received the data packet, for example local network entity 142, retrieves the IP address of the mobile entity 151 and resolves the local router, via which the mobile entity 151 is connected to the local network 110, namely the local network entity 141, wherein the resolution is based on the network address of the mobile entity 151. The resolution can be made by sending a broadcast request within the local transport network 130, or by using mapping information from a message received earlier from the local network entity 141, or by querying a local resolution server in the local network 110. The data packet can then be forwarded from the local network entity 142 as an originating local network entity to the local network entity 141 as a destination local router, based on the results of the resolution, namely the address of the local network entity 141. The mapping information between the local network entity 141 and the mobile entity 151 can be stored in the local network entity 142 in order to forward subsequent packets based on the stored mapping information.

Figure 2:
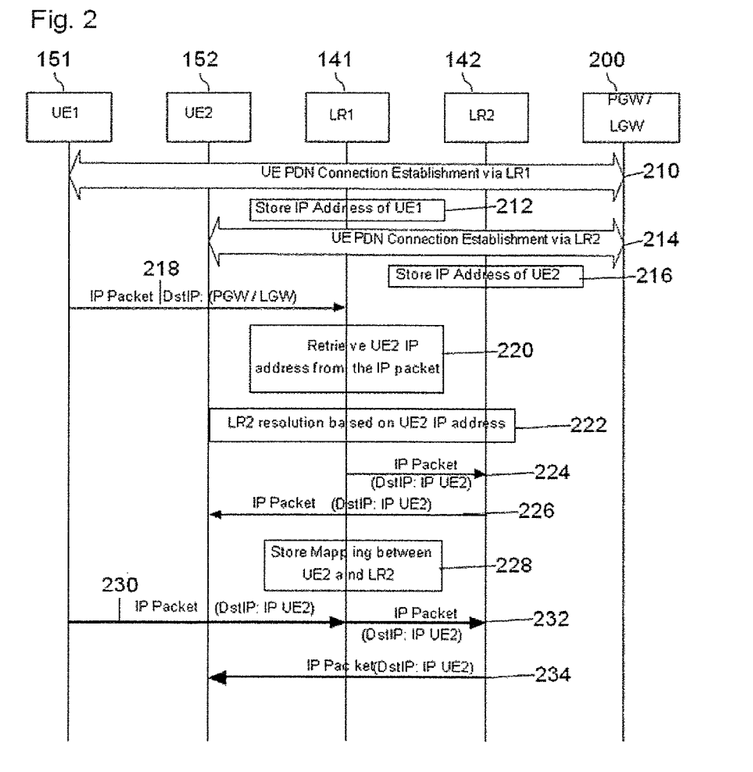
FIG. 2 shows a flowchart of a method according to an implementation form.

FIG. 2 shows a flowchart of a method according to an implementation form. In this embodiment, mobile entities 151 and 152, local network entities 141 and 142 and a packet data network gateway or local gateway (PGW/LGW) 200 are part of the communication environment. In a step 210, a packet data network (PDN) connection is established for the first mobile entity 151 via the first local network entity 141 over PGW/LGW 200. During the establishment a network address, for example an IP address, is allocated to the first mobile entity 151 by the PGW/LGW 200. In step 212, the IP address of the first mobile entity 151 is stored in the local network entity 141. Similar to steps 210 and 212, in steps 214 and 216, a PDN connection is established for the second mobile entity 152 via the second local network entity 142 with the PGW/LGW 200, and an IP address allocated to the second mobile entity 152 is stored in the second local network entity 142. The local network entities 141, 142 are local routers according to an implementation form.

In step 218, an IP packet is sent from the first mobile entity 151 to its corresponding local network entity 141. The IP packet has a destination IP of the PGW/LGW 200, for example a router network address. However, the IP packet is finally targeted at the second mobile entity 152 such that the IP address of the second mobile entity 152 is comprised by the IP packet. This IP address of the second mobile entity 152 is retrieved from the IP packet by the first local network entity 141 in step 220. In step 222, a mapping between the second mobile entity 152 and the corresponding local network entity 142 is resolved based on the IP address of the second mobile entity 152 retrieved before. Accordingly, the first local network entity 141 knows that packets for the second mobile entity 152 are to be routed via the second local network entity 142. Hence, in step 224, the IP packet is sent from the first local network entity 141 to the second local network entity 142 and, in step 226, from the second local network entity 142 to the second mobile entity 152.

The mapping between the second mobile entity 152 and the second local network entity 142 is stored by the first local network entity 141 in step 228. Hence, following, subsequent packets targeted at the second mobile entity 152 and originating from the first mobile entity 151 can be routed from the first mobile entity 151 to the first local network entity 141 in step 230, from the first local network entity 141 to the second local network entity 142 in step 232, and finally from the second local network entity 142 to the second mobile entity 152 in step 234.

Figure 3:
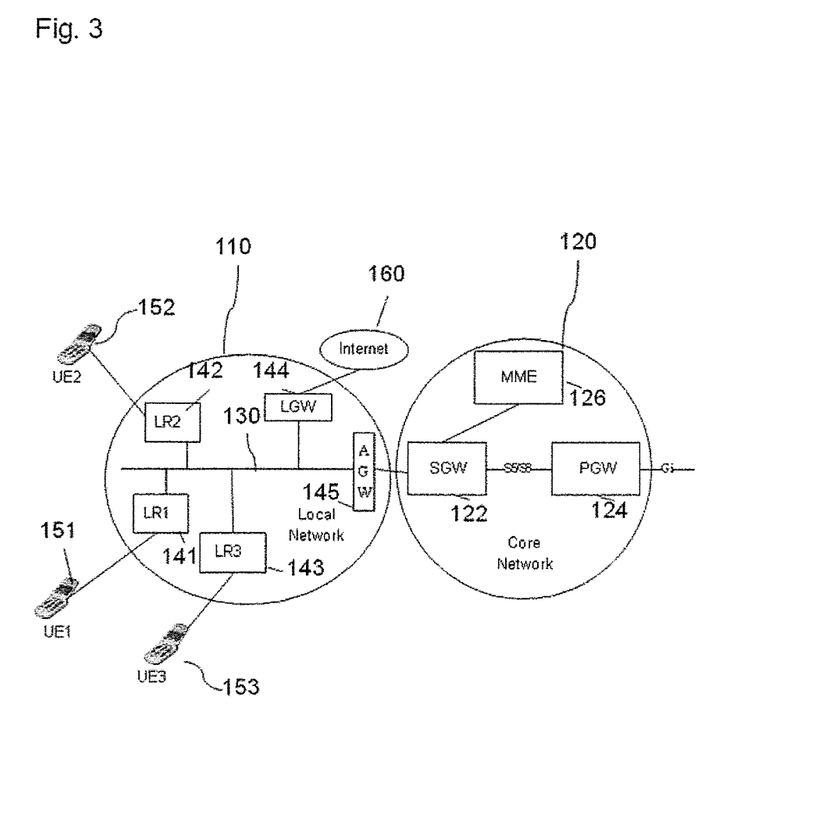
FIG. 3 shows a communication network according to an implementation form.

FIG. 3 shows a further embodiment of a communication network, which is based on the communication network shown in FIG. 1. In this embodiment, the local transport network 130, for example, is an Ethernet-based network. The local network entity 144 is a local gateway to the Internet 160. The local network entity 145 is an access gateway (AGW) to the core network 120.

Figure 4:
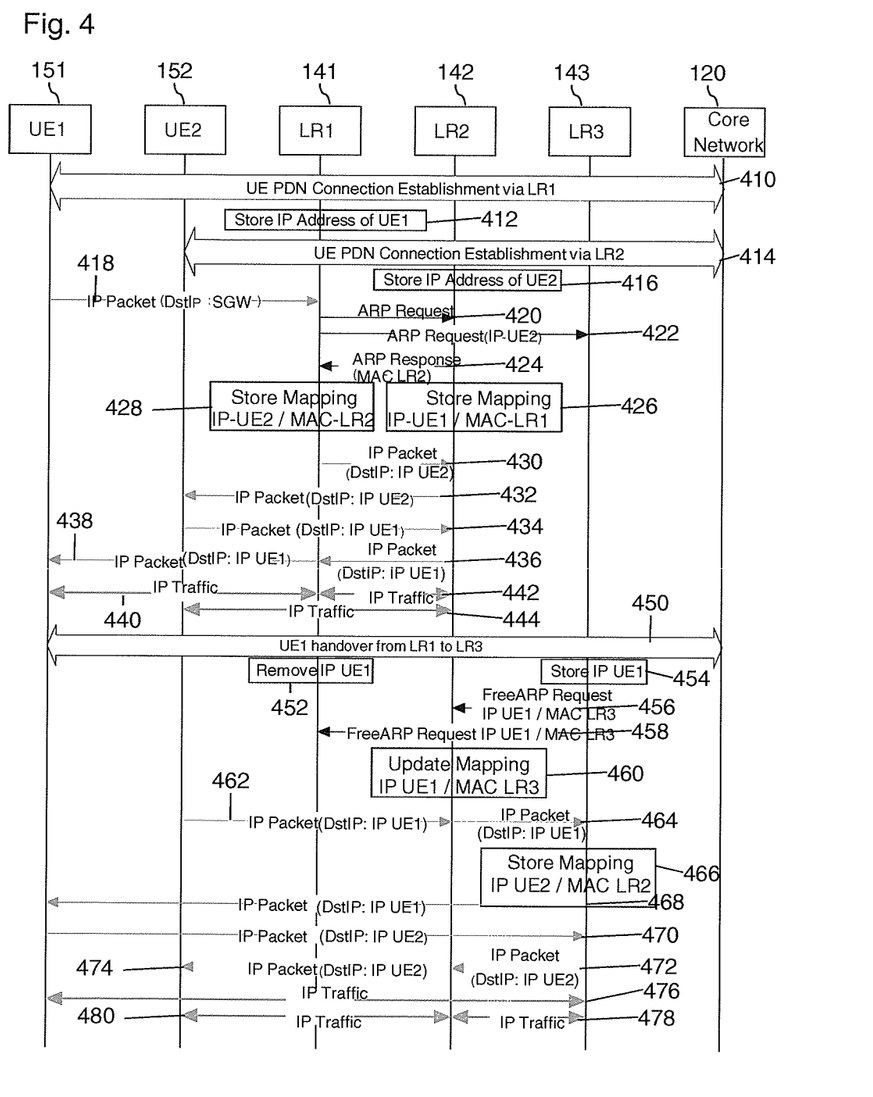
FIG. 4 shows a flowchart of a method according to an implementation form.

FIG. 4 shows a flowchart of a method according to a further implementation form. Similar to steps 210, 212, 214 and 216, in steps 410, 412, 414, 416, a PDN connection with the core network 120 is established for the first mobile entity 151 via the first local network entity 141 and for the second mobile entity 152 via the second local network entity 142. Respective IP addresses of the mobile entities 151, 152 are stored in the local network entities 141, 142.

In step 418, the first mobile entity 151 sends an IP packet to the local network entity 141, which is addressed to the IP address of the serving gateway 122, but includes, encapsulated, the final IP address of the second mobile entity 152, which is retrieved by the first local network entity 141. Accordingly, in steps 420 and 422, the first local network entity 141 sends ARP requests to the second local network entity 142 and the third local network entity 143, each of the ARP requests comprising the IP address of the second mobile entity 152. As the third local network entity 143 is not connected with the second mobile entity 152, no response is sent from the third local network entity 143. However, in step 424, the second local network entity 142 sends an ARP response to the first local network entity 141 including the MAC address of the second local network entity 142.

From the communication so far, the second local network entity 142 knows that the first mobile entity 151 is connected to the local network via the first local network entity 141 and stores this mapping information in step 426. Based on the ARP response, in step 428, the first local network entity 141 stores the mapping information between the second mobile entity 152 and the second local network entity 142. In particular, the mapping information stored in steps 426 and 428 comprises the IP address of the respective mobile entity and the MAC address of the corresponding local router. Based on the mapping information retrieved, in step 430, the first local network entity 141 sends the IP packet targeted at the second mobile entity 152 to the second local network entity 142, which forwards this packet to its final destination, namely the second mobile entity 152, in step 432. A response packet from the second mobile entity 152 to the first mobile entity 151 is sent to the second local network entity 142 in step 434 from the second local network entity 142 to the first local network entity 141 in step 436 and from the first local network entity 141 to the first mobile entity 151 in step 438, based on the previously stored mapping information.

Subsequent IP traffic between the first and the second mobile entity 151, 152 is transmitted via the local network entities 141, 142 in steps 440, 442, 444, also based on the previously stored mapping information.

In step 450, a handover for the first mobile entity 151 from the first local network entity 141 to the third local network entity 143 is initiated. To this end, in step 452, the IP address of the first mobile entity 151 is removed from the first local network entity 141 and the same, unchanged IP address of the first mobile entity 151 is stored in the third local network entity 143.

In steps 456 and 458, the third local network entity 143 announces the new mapping information to the remaining local network entities 141, 142 by respective FreeARP requests. In response to this updated information, the second local network entity 142 updates its mapping information between the IP address of the first mobile entity 151 and the MAC address of the third local network entity 143 in step 460.

In step 462, the second mobile entity 152 sends an IP packet to its corresponding local network entity 142, the IP packet having a final destination being the first mobile entity 151. As the second local network entity 142 has the corresponding mapping information for the first mobile entity 151 stored, the IP packet can immediately be forwarded to the corresponding local network entity 143 in step 464. As the IP packet originates from the second mobile entity 152 and is routed via the second local network entity 142, the third local network entity 143 retrieves the corresponding mapping information between the IP address of the second mobile entity 152 and the MAC address of the second local network entity 142. This mapping information is stored in step 466 in the local network entity 143. The IP packet is finally forwarded to the first mobile entity 151 from the third local network entity 143 in step 468. In step 470, a return IP packet is sent from the first mobile entity 151 targeted at the second mobile entity 152 to the corresponding local network entity 143, forwarded to the local network entity 142 in step 472 and finally forwarded to the second mobile entity 152 in step 474, based on the previously stored mapping information. In a similar way, subsequent IP traffic is routed between the first and the second mobile entity 151, 152 via the respective local network entities 152, 153 in steps 476, 478 and 480.

Figure 5:
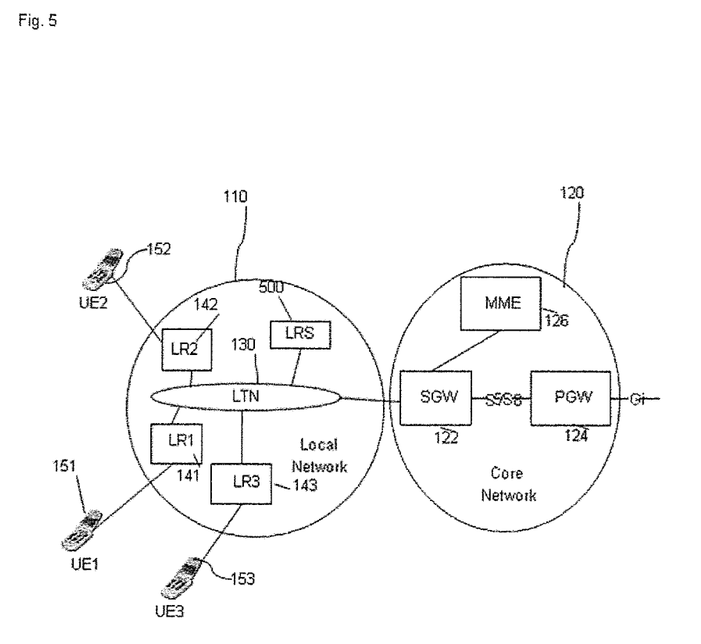
FIG. 5 shows a communication network according to an implementation form.

FIG. 5 shows a further implementation form of a communication network. The communication network of FIG. 5 is based on the communication network of FIG. 1, but further includes a local resolution server (LRS0 500 which is connected to the local transport network 130 and the local network 110, respectively. The local resolution server is adapted to store mapping information between each mobile entity connected to the local network 110, and the corresponding local network entity via which the mobile entity is connected to the local network. The local resolution server 500 can send stored mapping information in response to respective requests, for example including the IP address of the mobile entity, for which the mapping information is requested.

Figure 6:
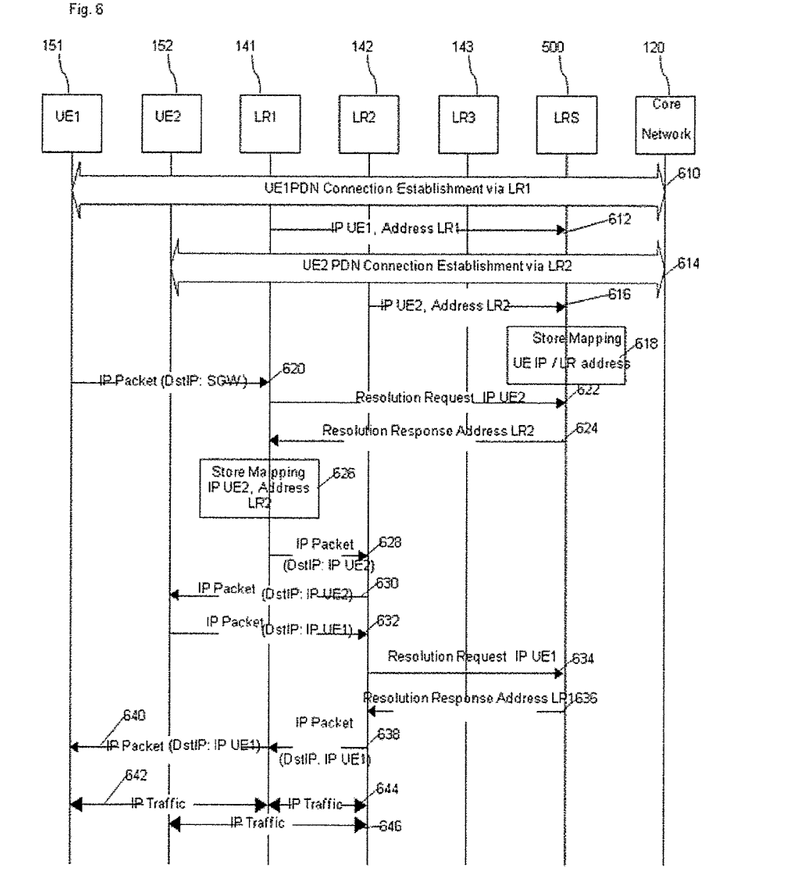
FIG. 6 shows a flowchart of a method according to an implementation form.

FIG. 6 shows a flowchart of a method according to a further implementation form. In step 610, a PDN connection is established for the first mobile entity 151 via the first local network entity 141 with the core network 120, wherein an IP address for the first mobile entity 151 is allocated by the core network 120, for example by the serving gateway 122. The IP address of the first mobile entity 151 and the address of the corresponding local network entity 141 are sent to the local resolution server 500 in step 612. In a similar fashion, in step 614, a PDN connection is established for the second mobile entity 152 via the second local network entity 142 with the core network 120. In step 616, the IP address allocated for the second mobile entity 152 and the address of the corresponding local network entity 142 are also sent to the local resolution server 500. In step 618, the mapping information provided for the first and the second local network entity 141, 142 is stored in the local resolution server 500.

In step 620, the first mobile entity 151 sends an IP packet having a destination IP of the serving gateway 122 to the corresponding local network entity 141, wherein the target IP address of the second mobile entity 152 is encapsulated in this IP packet and retrieved by the first local network entity 141. Hence, in step 622, the local network entity 141 sends a resolution request containing the IP address of the second mobile entity 152 to the local resolution server 500, which provides a respective response with the requested mapping information to the first local network entity 141 in step 624. In step 626, the mapping information received from the local resolution server 500 is stored in the local network entity 141. Similar to the previous embodiments, the IP packet is forwarded to the local network entity 142 in step 628, and from there to the final destination, the second mobile entity 152 in step 630.

In step 632, a response packet targeted at the first mobile entity 151 is sent from the second mobile entity 152 to its corresponding local network entity 142, which sends a respective resolution request containing the IP address of the first mobile entity 151 to the local resolution server 500 in step 634. A corresponding response to the second local network entity 142 containing the address of the local network entity 141 is provided by the local resolution server 500 in step 636. The IP packet originating from the second mobile entity 152 is then forwarded to the first local network entity 141 in step 638 and from there to the first mobile entity 151 in step 640. The mapping information between the first mobile entity 151 and the first local network entity 141, which is received from the local resolution server 500, can be stored in the second local network entity 142.

Based on the stored mapping information, IP traffic can be routed between the first and the second mobile entity 151, 152 via the corresponding local network entities 141, 142 in steps 642, 644, 646.

Figure 7:
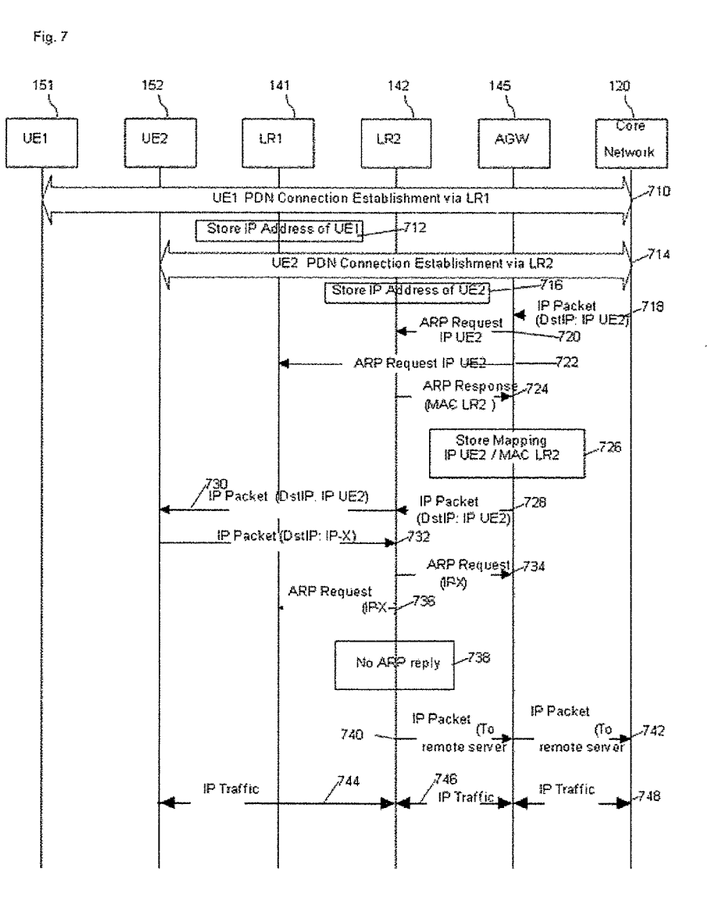
FIG. 7 shows a flowchart of a method according to an implementation form.

FIG. 7 shows a flowchart of a further implementation form of a method. Steps 710, 712, 714, 176 correspond to the steps 210, 212, 124, 216 of the method of FIG. 2 respectively.

In step 718, an IP packet is received from the core network 120 by the AGW 145, having a final destination IP encapsulated, namely the IP address of the second mobile entity 152. In steps 720 and 722, the AGW 145, which is a local network entity of the local network, sends an ARP request to the remaining local network entities 141, 142 including the IP address of the second mobile entity 152. In step 724, the second local network entity 142, which connects the second mobile entity 152 to the local network, sends an ARP response to the AGW 145, including the MAC address of the second local network entity 142. This mapping information between the IP address of the second mobile entity 152 and MAC address of the second local network entity 142 is stored in the AGW 145 in step 726. Based on this mapping information, in step 728, the AGW 145 forwards the IP packet to the local network entity 142, which then further forwards the IP packet to the final destination, the second mobile entity 152 in step 730.

The second mobile entity 152 sends a response packet to its corresponding local network entity 142 including a final destination IP of the former originating address IP-X, which may be located in the core network or outside the core network 120, but in this embodiment not within the local network 110. The local network entity 142 sends respective ARP requests in steps 734 and 736 including the IP address IP-X to the other local network entities 141, 145, but, in step 738, gets no ARP reply, because no mobile entity with IP-X is present in the local network 110. In consequence, the local network entity 142 sends the IP packet to the remote server via the AGW 145 in steps 740 and 742. The remote server may be the routing entity within the core network 120.

Following IP traffic is routed between the mobile entity 152 and the core network 120 via the local network entity 142 and the AGW 145 in steps 744, 746 and 748.

The embodiments described above can be combined and, in particular, respective resolution of the mapping information can be interchanged between the embodiments. The kind of LTN described or used in the embodiments should not be understood limiting but include any kind of logical or physical transport network.

What is claimed is:

1. A method for data transmission with a local network, the local network comprising a plurality of local network entities for connecting mobile entities to the local network and at least one local network entity gateway for connecting the local network to a data network, the method comprising:
receiving, by a first local network entity of the local network entities of the local network from a first mobile entity, a data packet addressed to the at least one local network entity gateway and comprising data addressed to a second mobile entity, and wherein the data packet encapsulates a network address of the second mobile entity;
retrieving, by the first local network entity, the network address of the second mobile entity encapsulated by the data packet;
determining, by the first local network entity on the basis of the network address of the second mobile entity, a second local network entity, via which the second mobile entity is connected to the local network; and
forwarding, by the first local network entity, the data comprised by the data packet to the second mobile entity via the second local network entity, wherein the forwarding bypasses the at least one local network entity gateway connected to the data network.

2. The method of claim 1, further comprising storing a mapping information between the second local network entity and the second mobile entity by the first local network entity, wherein determining the second local network entity comprises using the stored mapping information.

3. The method of claim 1, wherein determining the second local network entity comprises sending a broadcast request to the local network for receiving a mapping information between the second local network entity and the second mobile entity, the request comprising the network address of the second mobile entity.

4. The method of claim 3, wherein the second local network entity sends the requested mapping information in response to the request of the first local network entity.

5. The method of claim 3, wherein the local network comprises a local resolution server for storing mapping information between each mobile entity connected to the local network and the corresponding local network entity via which the mobile entity is connected to the local network, and wherein the local resolution server sends the stored mapping information between the second local network entity and the second mobile entity in response to the request of the first local network entity.

6. The method of claim 1, wherein the second local network entity sends a further data packet through the local network before receiving the data packet for the second mobile entity by the first local network entity, the further data packet comprising a mapping information between the second local network entity and the second mobile entity, and wherein determining the second local network entity comprises using the mapping information comprised by the further data packet.

7. The method of claim 6, wherein the further data packet is included in a broadcast message to the local network entities of the local network, the broadcast message being sent for announcing the mapping information.

8. The method of claim 6, wherein the further data packet is included in a unicast message to the first local network entity.

9. The method of claim 1, wherein the network address is allocated unambiguously to the first mobile entity by a data network external to the local network.

10. The method of claim 1, wherein forwarding comprises sending the data comprised by the data packet from the first local network entity to the second local network entity and from the second local network entity to the second mobile entity.

11. The method of claim 1, wherein the data packet is forwarded to the first local network entity by the second local network entity.

12. A local network entity for a local network, the local network comprising a plurality of local network entities for connecting mobile entities to the local network and at least one local network entity gateway for connecting the local network to a data network, which comprises a routing entity having a router network address allocated, the local network entity configured to:
receive, from a first mobile entity, a data packet addressed to the router network address and comprising data addressed to a second mobile entity, wherein the data packet encapsulates a network address of the second mobile entity, and wherein the second mobile entity is connected to the local network via a second local network entity of the plurality of further local network entities;
retrieve the network address of the second mobile entity on the basis of the data packet;
determine, on the basis of the network address of the second mobile entity, the second local network entity, via which the first mobile entity is connected to the local network; and
forwarding the data comprised by the data packet to the second mobile entity via the second local network entity, wherein the forwarding bypasses the at least one local network entity gateway connected to the data network.

13. The local network entity of claim 12, wherein the local network entity is configured to store a mapping information between the second local network entity and the second mobile entity, and to determine the second local network entity using the stored mapping information.

14. The local network entity of claim 12, wherein the local network entity is configured to connect the first mobile entity to the local network, and to send a mapping information between the local network entity and the first mobile entity connected to the local network via the local network entity in response to a request for the mapping information, the request being received from the local network.

* * * * *